United States Patent
Harth et al.

(10) Patent No.: US 8,020,929 B2
(45) Date of Patent: Sep. 20, 2011

(54) VEHICLE SEAT, ESPECIALLY MOTOR VEHICLE SEAT

(75) Inventors: Dieter Harth, Kusel (DE); Mathias Gischke, Kaiserslautern (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 172 days.

(21) Appl. No.: 12/395,765

(22) Filed: Mar. 2, 2009

(65) Prior Publication Data

US 2009/0218853 A1  Sep. 3, 2009

(30) Foreign Application Priority Data

Mar. 3, 2008 (DE) .................. 10 2008 012 715

(51) Int. Cl.
*B60N 2/02* (2006.01)

(52) U.S. Cl. ........... 297/92; 297/93; 297/94; 297/283.2; 297/362.11

(58) Field of Classification Search .............. 297/92–94, 297/108, 111, 283.2, 362.11
See application file for complete search history.

(56) References Cited

U.S. PATENT DOCUMENTS

| 802,519 | A | * | 10/1905 | Long .............................. 297/93 |
| 2,858,880 | A | * | 11/1958 | Fox ................................ 297/93 |
| 3,012,817 | A | * | 12/1961 | Hendrickson et al. ........ 297/93 |
| 3,175,861 | A | * | 3/1965 | Tcherniavsky ................. 297/93 |
| 3,246,926 | A | * | 4/1966 | Link ............................... 297/93 |
| 3,529,863 | A | * | 9/1970 | Belfry ............................ 296/66 |
| 3,743,350 | A | * | 7/1973 | Allen ............................. 297/94 |
| 3,751,740 | A | * | 8/1973 | Belk ............................... 5/37.1 |
| 3,955,846 | A | * | 5/1976 | Murphy ..................... 296/65.09 |
| 3,964,785 | A | * | 6/1976 | Plume ............................. 297/64 |
| 4,779,917 | A | * | 10/1988 | Campbell et al. .......... 296/65.09 |
| 5,056,849 | A | * | 10/1991 | Norris et al. ............... 296/65.05 |
| 5,098,154 | A | * | 3/1992 | Emery ............................ 297/92 |
| 6,474,741 | B2 | * | 11/2002 | Kamida et al. ........... 297/378.12 |
| 6,957,853 | B2 | * | 10/2005 | Williams et al. ............... 297/93 |
| 7,144,079 | B2 | * | 12/2006 | Syrowik et al. ................ 297/92 |
| 7,156,442 | B2 | * | 1/2007 | McManus et al. ......... 296/65.09 |
| 7,726,730 | B2 | * | 6/2010 | Peter et al. ..................... 297/92 |

FOREIGN PATENT DOCUMENTS

| DE | 102 42 968 A1 | 3/2004 |
| FR | 769 258 | 8/1934 |

* cited by examiner

*Primary Examiner* — Laurie Cranmer
(74) *Attorney, Agent, or Firm* — McGlew and Tuttle, P.C.

(57) ABSTRACT

A vehicle seat (1), especially motor vehicle seat, is provided with a base (3) and a main carrier (7), which is collapsible in relation to the base (3), and can be converted from a forward position into a backward position by collapsing the main carrier (7). The vehicle seat (1) has two cushioned carriers (11, 12) with upholstery, which are displaceable in relation to the main carrier (7). The moved first cushioned carrier (11) with its upholstery serves as the seat part and the extended second cushioned carrier (12) with its upholstery serves as the backrest in the forward position. The extended first cushioned carrier (11) with its upholstery serves as the backrest and the moved-in second cushioned carrier (12) with its upholstery serves as the seat part in the backward position.

20 Claims, 8 Drawing Sheets

VEHICLE SEAT, ESPECIALLY MOTOR VEHICLE SEAT

CROSS REFERENCE TO RELATED APPLICATIONS

This application claims the benefit of priority under 35 U.S.C. §119 of German Patent Application DE 10 2008 012 715.9 filed Mar. 3, 2008, the entire contents of which are incorporated herein by reference.

FIELD OF THE INVENTION

The present invention pertains to a vehicle seat, especially a motor vehicle seat, with a base and a main carrier collapsible in relation to the base, whereby the vehicle seat can be converted from a forward position into a backward position by collapsing the main carrier.

BACKGROUND OF THE INVENTION

A vehicle seat of this type has become known from DE 102 42 968 A1. For converting from the forward position into the backward position, the seat part is folded up and the backrest is folded backwards with one motion, whereby the folding axis arranged between the seat part and backrest is shifted forwards. The headrest is changed from the former backrest onto the former seat part, which now serves as the backrest.

SUMMARY OF THE INVENTION

A basic object of the present invention is to improve a vehicle seat of the type mentioned in the introduction.

According to the invention, a vehicle seat, especially motor vehicle seat is provided with a base and a main carrier collapsible in relation to the base, whereby the vehicle seat can be converted from a forward position into a backward position by collapsing the main carrier. The vehicle seat has two cushioned carriers with upholstery, which are displaceable in relation to the main carrier. The moved-in first cushioned carrier with its upholstery serves as the seat part and the extended second cushioned carrier with its upholstery serves as the backrest in the forward position. The extended first cushioned carrier with its upholstery serves as the backrest and the moved-in second cushioned carrier with its upholstery serves as the seat part in the backward position.

By means of the two cushioned carriers, which are displaceable in relation to the main carrier, the individual partial areas of the vehicle seat are able to perform their function as a short seat part or a long backrest. Changing the components is not necessary. Linear movements of the cushioned carrier, for example, with suitable crank guides, prevent jamming. A connecting rod between the cushioned carriers connects their movements, which simplifies the operation. Specially designed supports, which are displaceable in relation to the cushioned carriers, may be provided for the function of the headrest. The operation may take place manually or by means of a motor.

The present invention is described in detail below based on an exemplary embodiment shown in the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
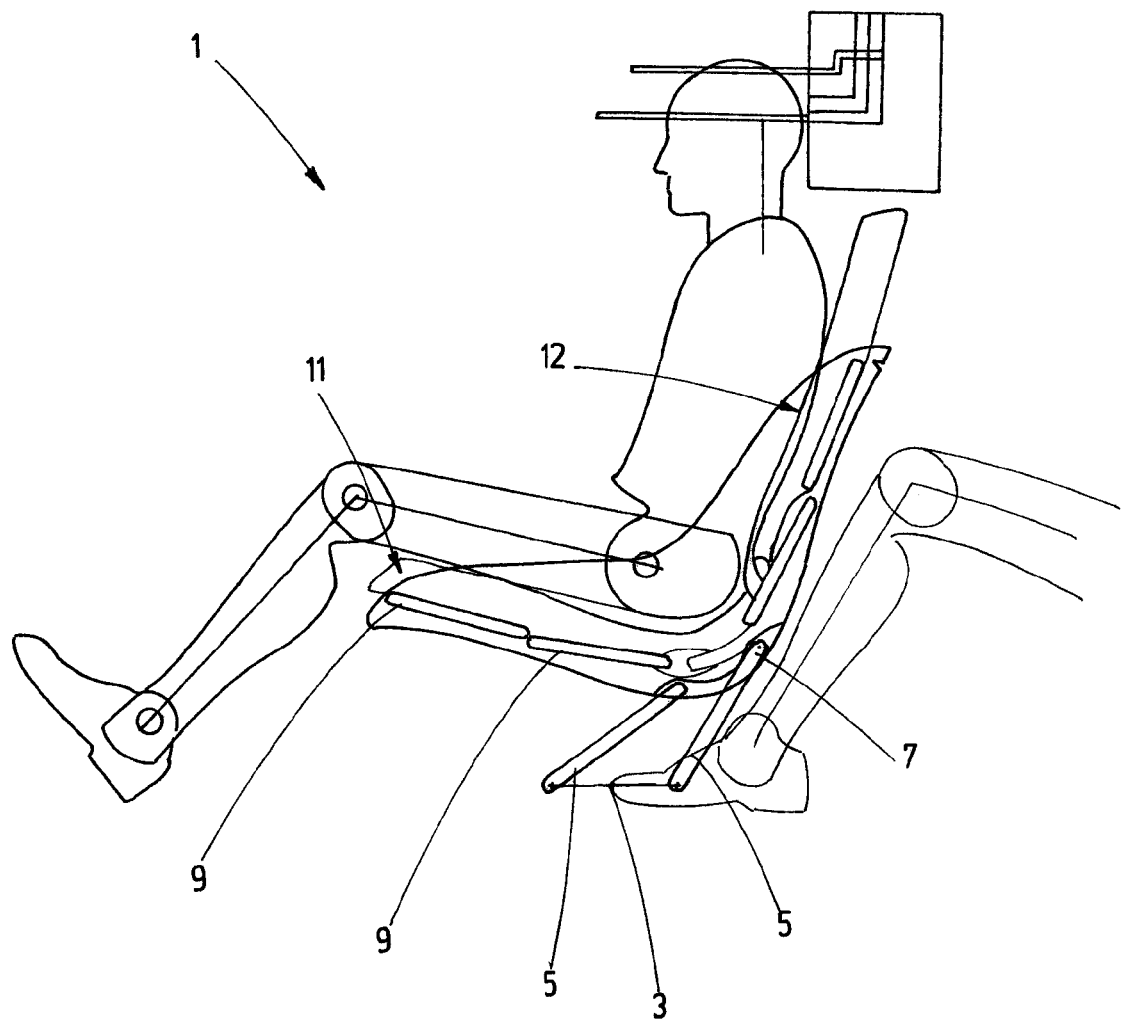
FIG. 1 is a schematic diagram of the exemplary embodiment according to the invention and showing passengers.
Figure 2:
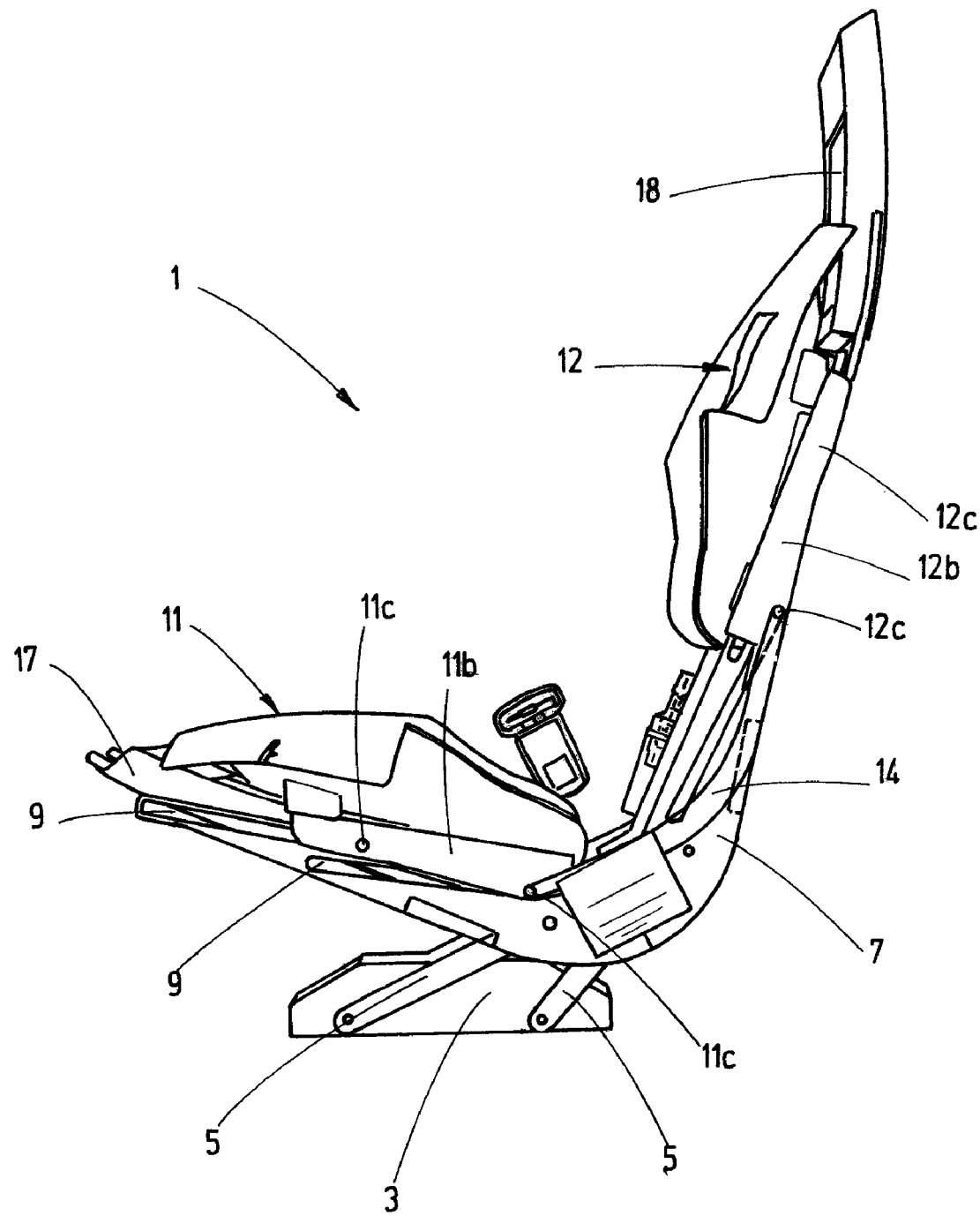
FIG. 2 is a lateral view of the uncushioned exemplary embodiment in the forward position.
Figure 3:
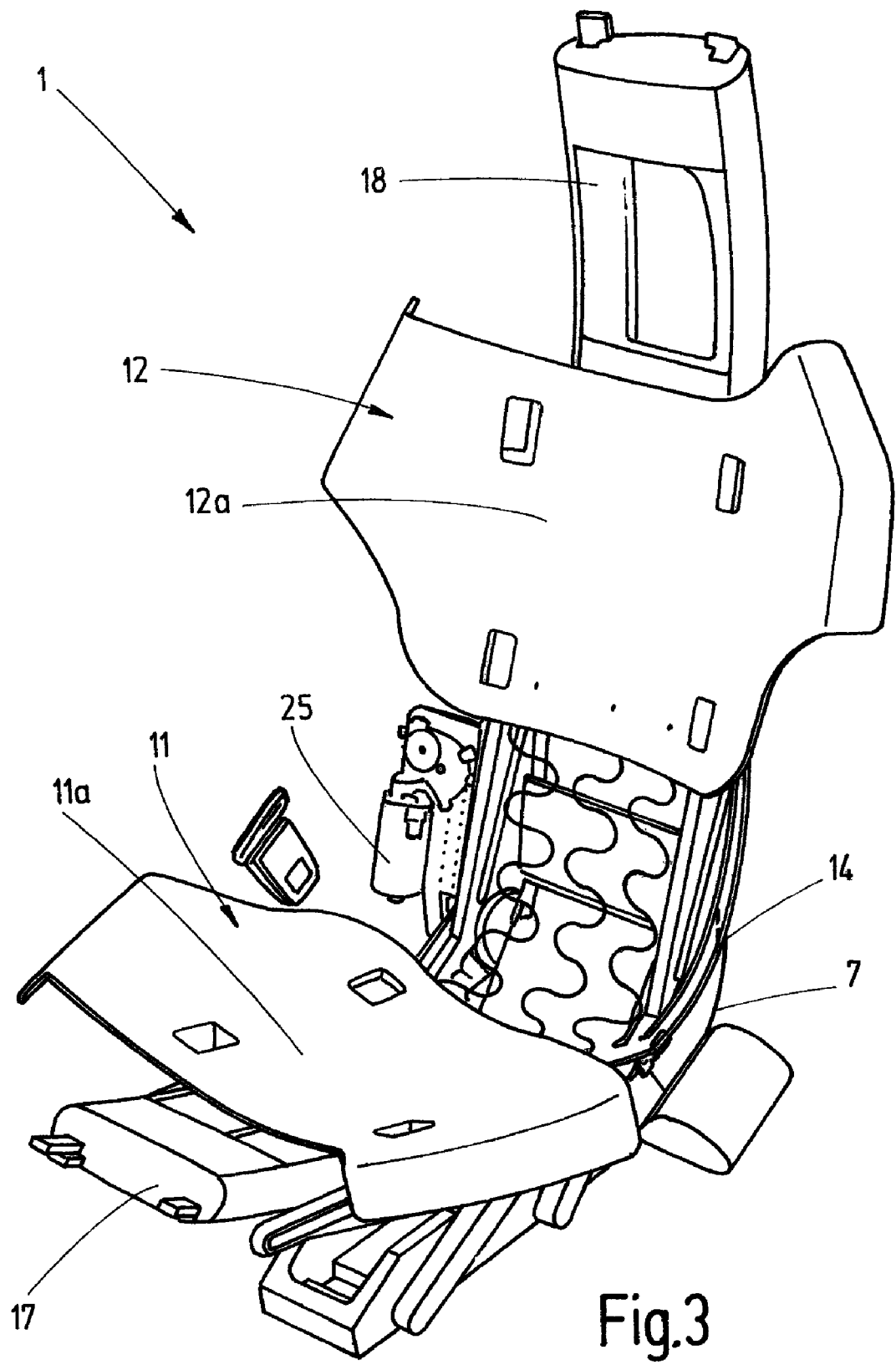
FIG. 3 is a first perspective view of the uncushioned exemplary embodiment in the forward position.
Figure 4:
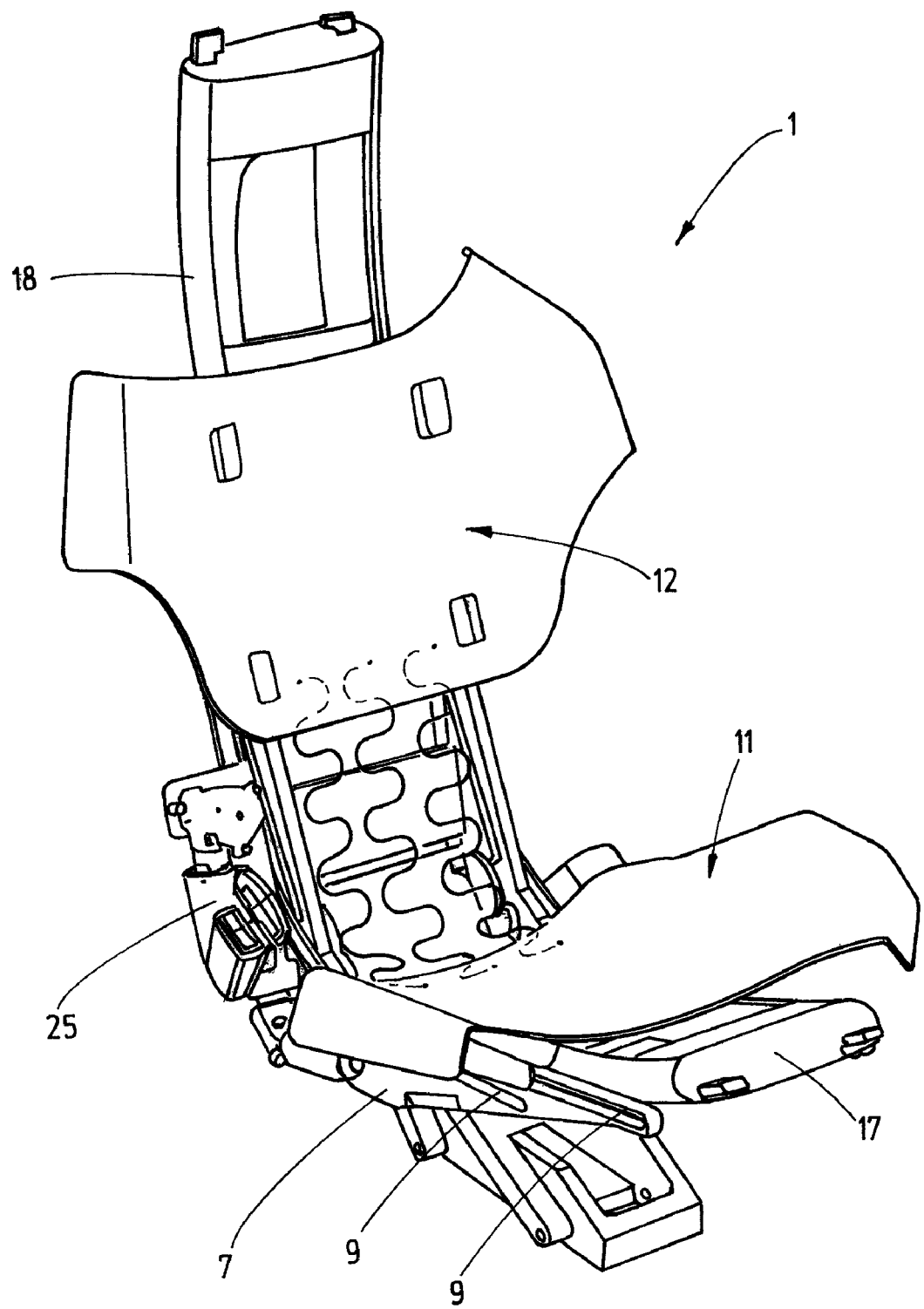
FIG. 4 is a second perspective view of the uncushioned exemplary embodiment in the forward position.
Figure 5:
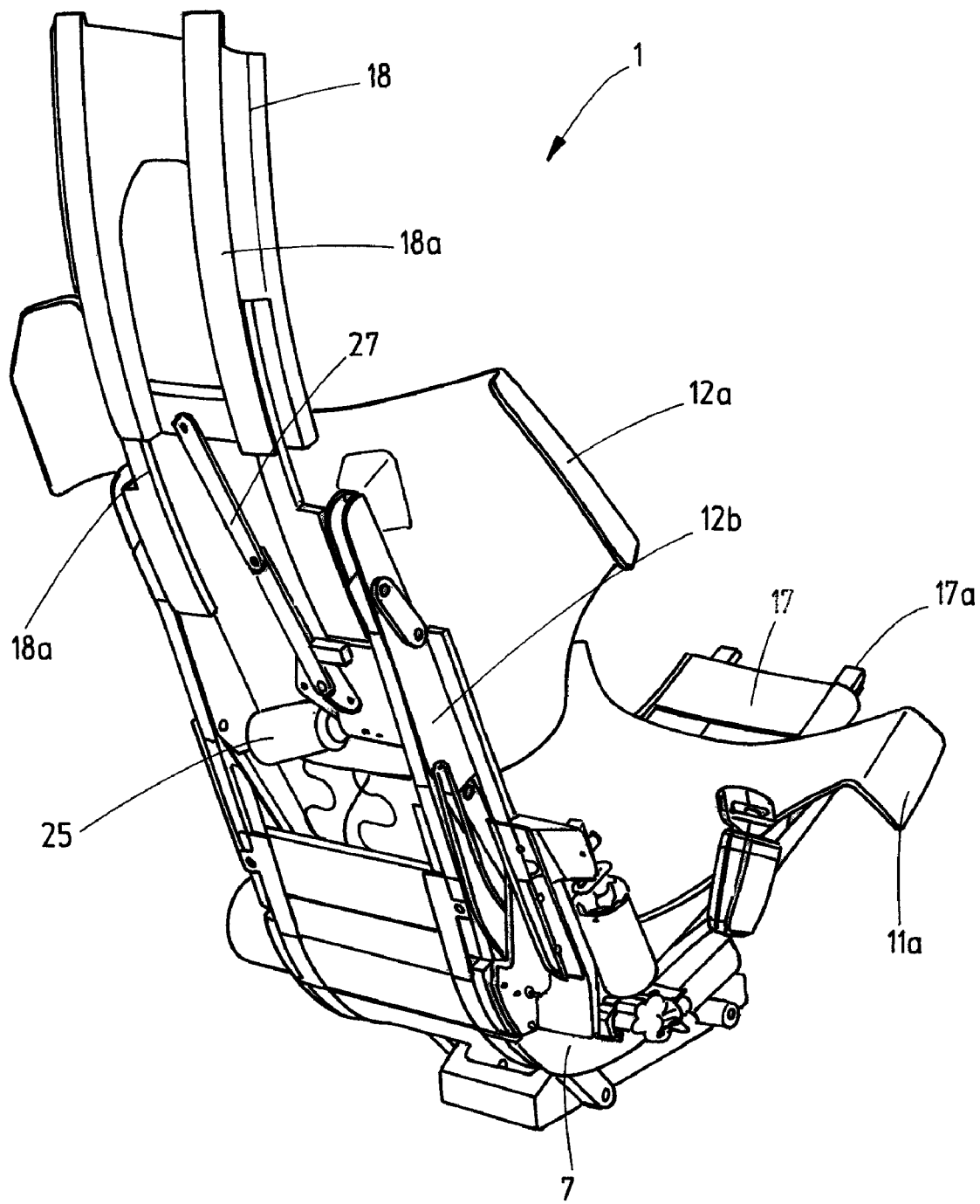
FIG. 5 is a third perspective view of the uncushioned exemplary embodiment in the forward position.
Figure 6:
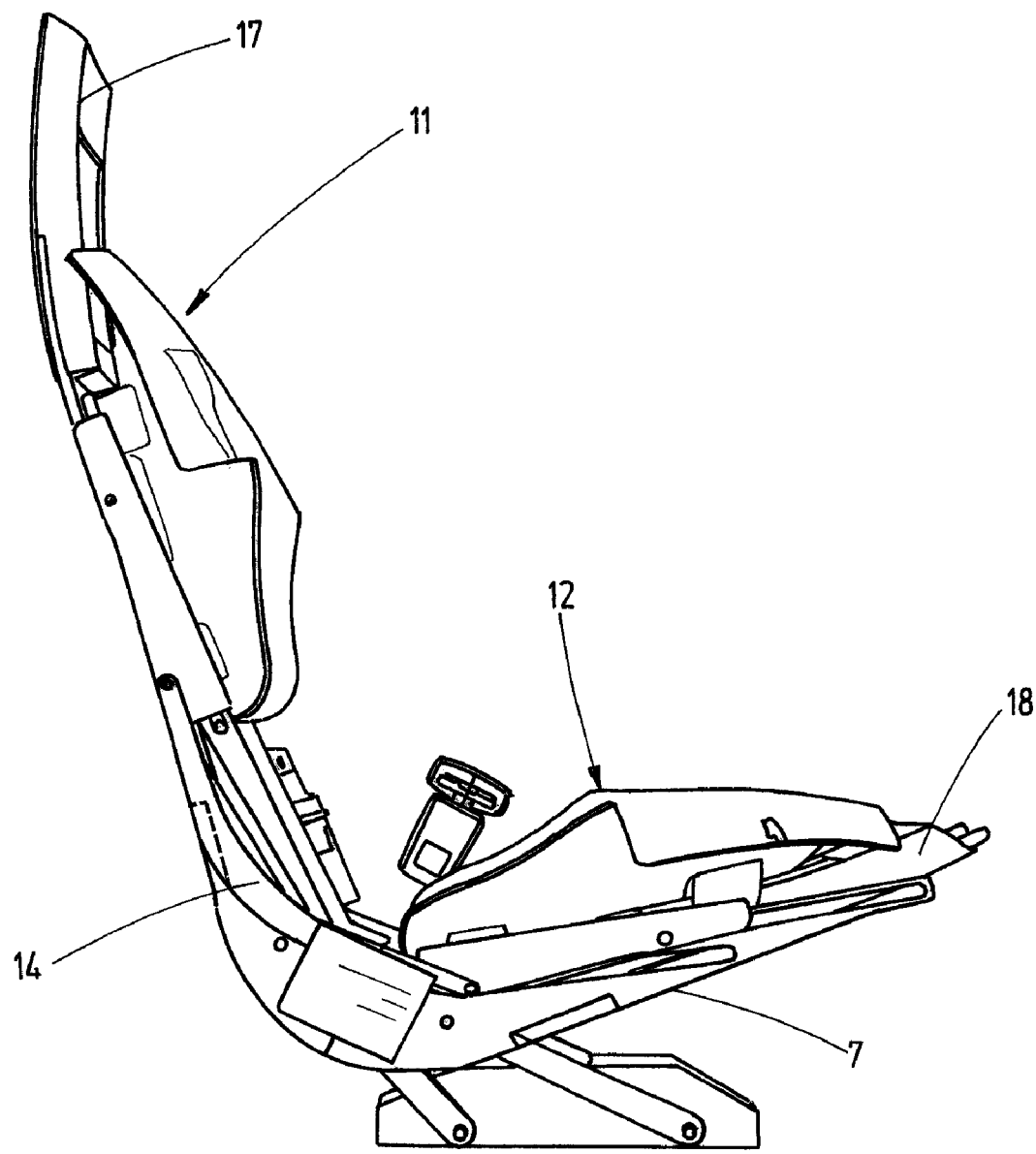
FIG. 6 is a lateral view of the uncushioned exemplary embodiment in the backward position.
Figure 7:
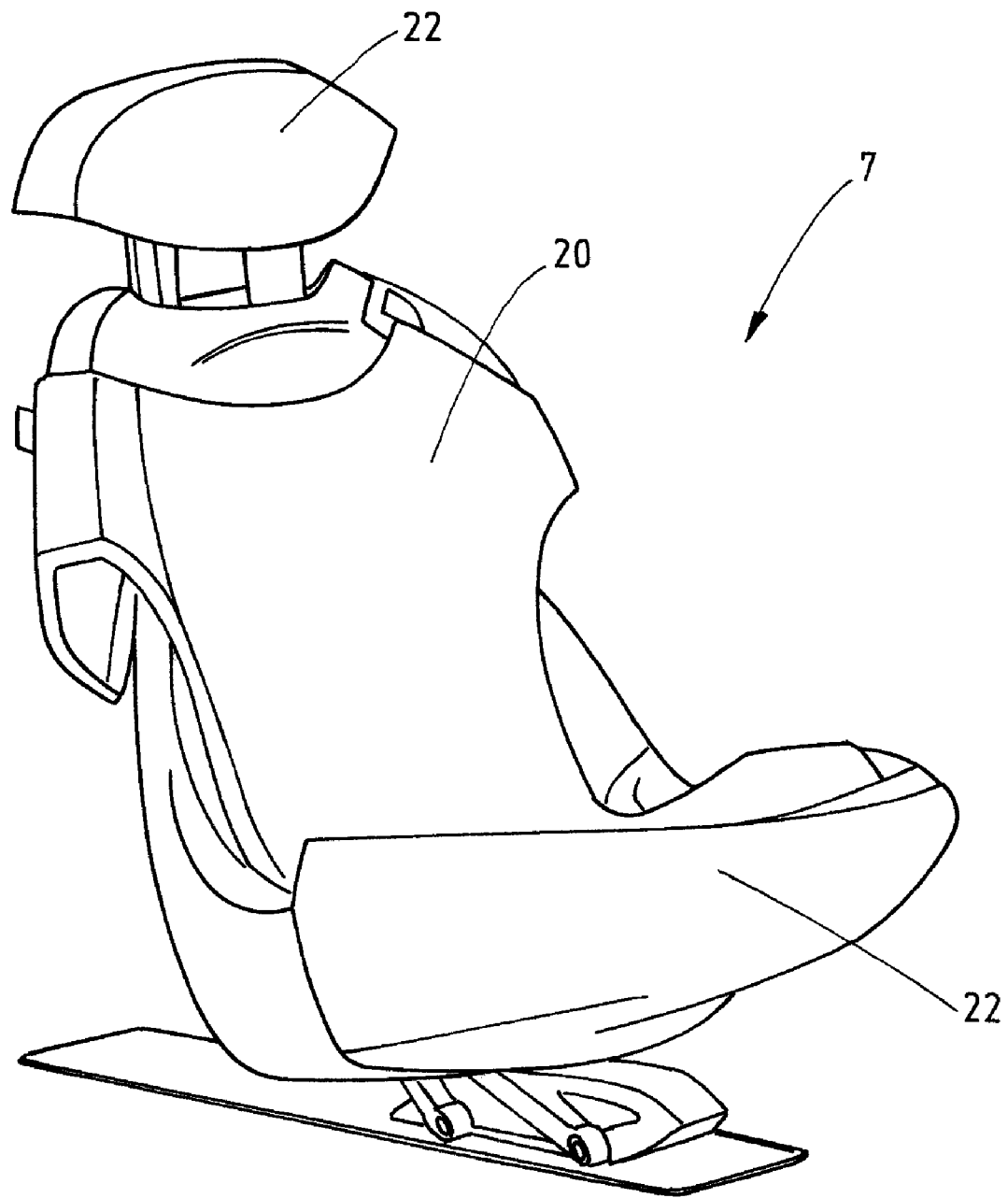
FIG. 7 is a perspective view of the cushioned exemplary embodiment.
Figure 8:
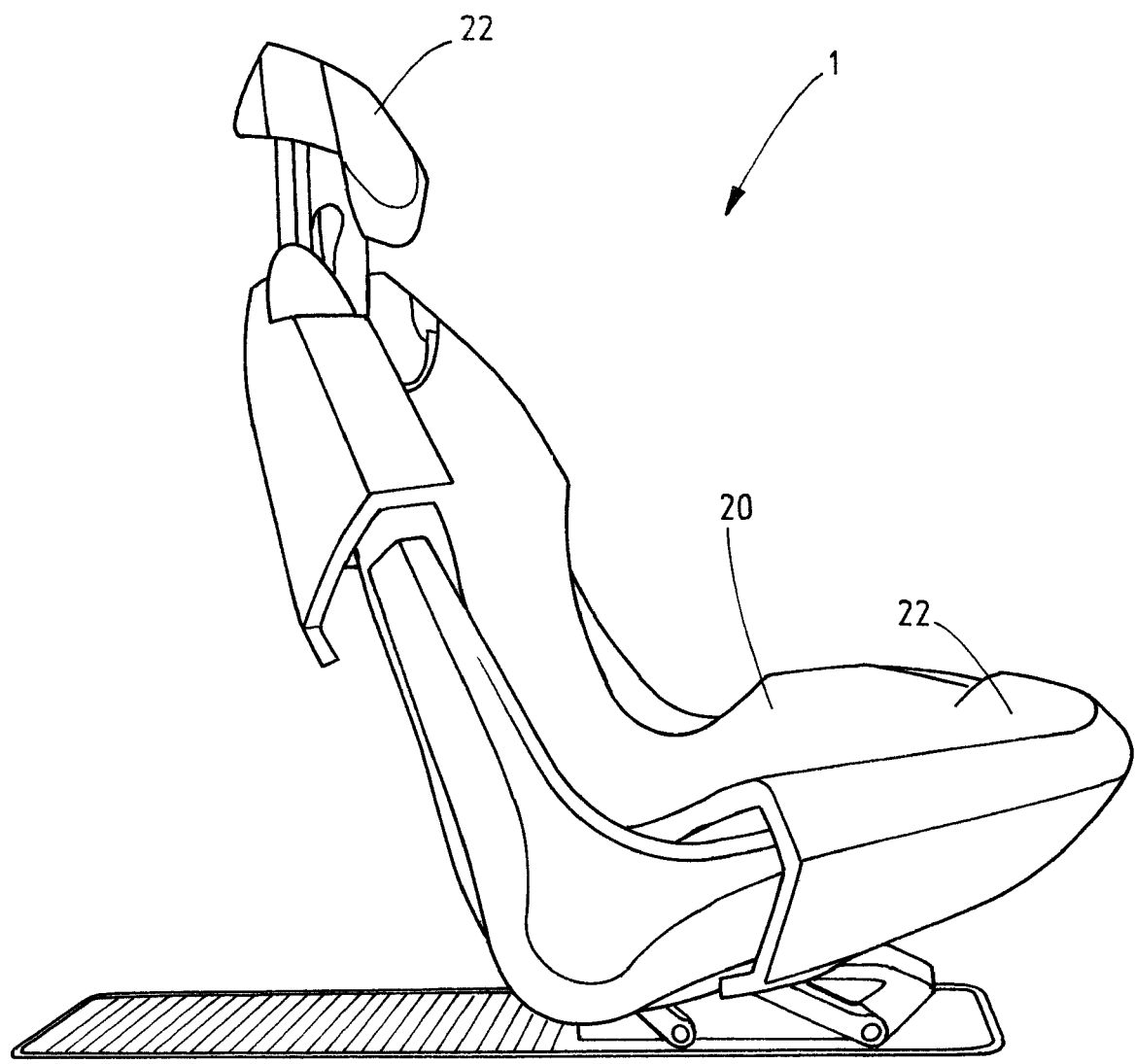
FIG. 8 is a lateral view of the cushioned exemplary embodiment.

Referring to the drawings in particular, a vehicle seat 1 for a motor vehicle has a base 3. The base 3 is displaceable here by means of seat tracks in the longitudinal direction of the seat, with which the vehicle seat 1 can be adjusted lengthwise, i.e., its seat lengthwise position can be adjusted. As an alternative, the base 3 may be fixed and be connected directly to the vehicle structure of the motor vehicle. Coupled to the base 3 are two pairs of rocker arms 5, to which is coupled in turn a two-legged, approximately L-shaped main carrier 7. The main carrier 7 can collapse (i.e., a swivel movement of the main carrier 7 in relation to the base 3) by means of the four bars defined by the rocker arms 5 on both sides of the vehicle seat between two positions, which correspond to a forward position and to a backward position of the vehicle seat 1, in relation to the direction of travel. In these two positions, one leg of the main carrier 7 is respectively sloped slightly against the vertical, and the other leg of the main carrier 7 points slightly obliquely upwards against the horizontal.

On both sides of the vehicle seat, the main carrier 7 has two cranks each on each of its two legs, i.e., a total of eight cranks 9, which all have a straight (i.e., linear) design here. A first cushioned carrier 11 and a second cushioned carrier 12 each have a shell 11a and 12a and two carrier tracks 11b and 12b, respectively. The C-shaped, profiled carrier tracks 11b and 12b, which are parallel to one another, each overlap the material parts of the main carrier 7 containing the cranks 9, whereby the carrier tracks extend through an associated crank 9 each by means of a guide bolt 11c or 12c, respectively. As a result, the two cushioned carriers 11 and 12 are both secured and guide on the main carrier 7 and are arranged in a displaceable manner, i.e., can be moved in and moved out, in relation to the latter.

On both sides of the vehicle seat, the two cushioned carriers 11 and 12 are connected to one another in an articulated manner by means of a connection rod 14 each. The rigid connecting rods 14 are, in this case, connected to the respective cushioned carrier 11 and 12 by means of one of the guide bolts 11c and 12c. Moving in the first cushioned carrier 11 thus brings about an extension of the second cushioned carrier 12 and vice versa. On the first cushioned carrier 11 is displaceably arranged a first support 17 and on the second cushioned carrier 12 is displaceably arranged a second support 18, i.e., can be moved in and moved out in relation to the respective cushioned carrier 11 and 12. For this, a pair of extension bars 17a and 18a, respectively, is provided, from which one track is fastened to the support 17 or 18 and the other track is fastened to the cushioned carrier 11 or 12, respectively. The two cushioned carriers 11 and 12, or in more exact terms, the two shells 11a and 12a, and the area between the shells 11a and 12a are cushioned with a common seat cushion 20, the two supports 17 and 18 moved in are each cushioned with a specially designed support cushion 22. Insofar as uncushioned area[s] are visible, the vehicle seat 1 still has suitable covers.

The collapsing of the main carrier 7 in relation to the base 3, the displacement of the two cushioned carriers 11 and 12 in relation to the main carrier 7 and the displacement of the two supports 17 and 18 can take place manually, possibly with spring support. In the exemplary embodiment, all of these adjustments take place by means of a motor, i.e., at least one electric motor 25 provided on the main carrier 7, acts, for example, by means of a lever mechanism 27, on one of the cushioned carriers 11 or 12 or on the connecting rod 14, and two other electric motors 25, which are provided on the cushioned carriers 11 and 12 act, for example, each by means of another lever mechanism 27, on the associated support 17 or 18. The electric motors 21 may also be provided on the respective other component.

In the forward position of the vehicle seat 1, the moved-in first cushioned carrier 11 with its upholstery (i.e., its portion of the seat cushion 20) and the moved-in first support 17 with its upholstery (i.e., its support cushion 22) serve as the seat part, while the extended second cushioned carrier 12 with its upholstery (i.e., its portion of the seat cushion 20) serves as the backrest and the second support 18, extended as required, with its upholstery (i.e., its support cushion 22) serves as the headrest. When converting from the forward position into the backward position, the main carrier 7 collapses, the first cushioned carrier 11 extends, if required the first support 17 as well, while the second cushioned carrier 12 and possibly the second support 18 move in. In the backward position of the vehicle seat 1, the moved-in second cushioned carrier 12 with its upholstery (i.e., its portion of the seat cushion 20) and the moved-in second support 18 with its upholstery (i.e., its support cushion 22) serve as the seat part, while the extended first cushioned carrier 11 with its upholstery (i.e., its portion of the seat cushion 20) serves as the backrest and the first support 17, extended as required, with its upholstery (i.e., its support cushion 22) serves as the headrest.

While a specific embodiment of the invention has been shown and described in detail to illustrate the application of the principles of the invention, it will be understood that the invention may be embodied otherwise without departing from such principles.

APPENDIX

List of Reference Numbers

| | |
|---|---|
| 1 | Vehicle seat |
| 3 | Base |
| 5 | Rocker arm |
| 7 | Main carrier |
| 9 | Crank |
| 11 | First cushioned carrier |
| 11a | Shell of the first cushioned carrier |
| 11b | Carrier track of the first cushioned carrier |
| 11c | Guide bolts of the first cushioned carrier |
| 12 | Second cushioned carrier |
| 12a | Shell of the second cushioned carrier |
| 12b | Carrier track of the second cushioned carrier |
| 12c | Guide bolts of the second cushioned carrier |
| 14 | Connecting rod |
| 17 | First support |
| 17a | Pair of extension bars of the first support |
| 18 | Second support |
| 18a | Pair of extension bars of the second support |
| 20 | Seat cushion |
| 22 | Support cushion |
| 25 | Electric motor |
| 27 | Lever mechanism |

What is claimed is:

1. A motor vehicle seat comprising:
a base;
a main carrier collapsible in relation to the base, whereby the vehicle seat can be converted from a forward position into a backward position by collapsing the main carrier;
a first cushioned carrier, with upholstery, connected to the main carrier and displaceable between a moved-in position and an extended position in relation to the main carrier, the first cushioned carrier in the moved-in position providing an upholstery seat in the forward position and the first cushioned carrier in the extended position providing an upholstery backrest in the backward position, said first cushioned carrier comprising a first carrier support, said first carrier support being displaceable relative to said first cushioned carrier, said first carrier support comprising a first carrier support upholstery, said first carrier support upholstery defining a headrest in the backward position for supporting a head portion of a user; and
a second cushioned carrier, with upholstery, connected to the main carrier and displaceable between a moved-in position and an extended position in relation to the main carrier, the second cushioned carrier in the extended position providing an upholstery backrest in the forward position and the second cushioned carrier in the moved-in position providing an upholstery seat in the backward position, said second cushioned carrier comprising a second carrier support, said second carrier support being displaceable relative to said second cushioned carrier, said second carrier support comprising a second carrier support upholstery, said second carrier support upholstery defining the headrest in the forward position for supporting the head portion of the user.

2. A motor vehicle seat in accordance with claim 1, wherein said main carrier is connected to the base by means of at least one pair of rocker arms.

3. A motor vehicle seat in accordance with claim 1, wherein each of the cushioned carriers is displaceable in relation to the main carrier by means of guide tracks and cranks, whereby the cranks have a straight design.

4. A motor vehicle seat in accordance with claim 1, wherein the first cushioned carrier and the second cushioned carrier are connected to one another in an articulated manner by means of at least one connecting rod.

5. A motor vehicle seat in accordance with claim 1, wherein said first cushioned and said second cushioned carrier are cushioned with a common seat upholstery cushion, said first carrier support upholstery defining a forward user leg contacting portion in the forward position for contacting a leg portion of the user, said forward user leg contacting portion being adjacent to said upholstery of said first cushioned carrier in the forward position, said second carrier support upholstery forming a backward user leg engaging portion in the backward position for engaging the leg portion of the user, said backward user leg engaging portion being adjacent to said upholstery of said second cushioned carrier in the backward position.

6. A motor vehicle seat in accordance with claim 1, wherein said first carrier support is displaceable in relation to said first cushioned carrier by means of at least one pair of extension bars, said second carrier support being displaceable in relation to said second cushioned carrier by means of at least another pair of extension bars.

7. A motor vehicle seat in accordance with claim 1, further comprising a motor arrangement wherein the main carrier is collapsible in relation to the base by means of the motor arrangement.

8. A motor vehicle seat in accordance with claim 1, further comprising a motor arrangement wherein the cushioned carriers are displaceable in relation to the main carrier by means of the motor arrangement.

9. A motor vehicle seat in accordance with claim 1, further comprising a motor arrangement wherein the said first carrier support and said second carrier support are displaceable in relation to said first cushioned carrier and said second cushioned carrier by means of the motor arrangement.

10. A motor vehicle seat in accordance with claim 1, wherein the vehicle seat can be adjusted lengthwise.

11. A motor vehicle seat comprising:
a base;
a main carrier;
a collapsing connection means between the base and the main carrier for swiveling movement of the main carrier in relation to the base, whereby the vehicle seat can be converted from a forward position with the main carrier having a forward facing orientation relative to the base into a backward position with the main carrier having a backward facing orientation relative to the base;
a first cushioned carrier, with upholstery, connected to the main carrier and displaceable between a moved-in position and an extended position in relation to the main carrier, the first cushioned carrier in the moved-in position providing a forward upholstery seat in the forward position and the first cushioned carrier in the extended position providing an upholstery backrest in the backward position;
a first support displaceable in relation to the first cushioned carrier by means of at least one pair of extension bars such that said first support is movable between a retracted position and an extended position, the first support forming a headrest in said extended position with the vehicle seat in the backward position, said first support forming a user leg contact seat portion in said retracted position with the vehicle seat in the forward position, said user leg contact seat portion being adjacent to said forward upholstery seat with the vehicle seat in the forward position;
a second cushioned carrier, with upholstery, connected to the main carrier and displaceable between a moved-in position and an extended position in relation to the main carrier, the second cushioned carrier in the extended position providing an upholstery backrest in the forward position and the second cushioned carrier in the moved-in position providing a backward upholstery seat in the backward position; and
a second support displaceable in relation to the second cushioned carrier by means of at least one pair of extension bars such that said second support is movable between a support retracted position and a support extended position, the second support forming a headrest in said support extended position with the vehicle seat in the forward position, said second support forming a user leg engaging seat portion in said retracted position with the vehicle seat in the backward position, said user leg engaging seat portion being adjacent to said backward upholstery seat with the vehicle seat in the backward position.

12. A motor vehicle seat in accordance with claim 11, wherein the collapsing connection means comprises a pair of rocker arms connecting between the base and the main carrier.

13. A motor vehicle seat in accordance with claim 12, further comprising:
first guide tracks and cranks defining a connection between the first cushioned carrier and the main carrier for displaceable movement of the first cushioned carrier in relation to the main carrier; and
second guide tracks and cranks defining a connection between the second cushioned carrier and the main carrier for displaceable movement of the second cushioned carrier in relation to the main carrier.

14. A motor vehicle seat in accordance with claim 12, further comprising a connecting rod connecting the first cushioned carrier and the second cushioned carrier to one another in an articulated manner.

15. A motor vehicle seat in accordance with claim 12, wherein the cushioned carriers are cushioned with a common seat upholstery cushion.

16. A motor vehicle seat in accordance with claim 12, further comprising a motor arrangement for movement of at least one of:
the main carrier in relation to the base;
the cushioned carriers in relation to the main carrier;
the supports in relation to the cushioned carriers.

17. A motor vehicle seat in accordance with claim 11, wherein said first support has a first support end, said first support end being located at a first distance from said first cushioned carrier in said retracted position with the vehicle seat in the forward position, said first support end being located at a second distance from said first cushioned carrier in said extended position with the vehicle seat in the backward position, said first distance being less than said second distance, said second support having a second support end, said second support end being located at a first support distance from said second cushioned carrier in said extended support position with the vehicle seat in the forward position, said second support end being located at a second support distance from said second cushioned carrier in said retracted support position with the vehicle seat in the backward position, said first support distance being greater than said second support distance.

18. A motor vehicle seat comprising:
a base;
a main carrier;
a collapsing connection means between said base and said main carrier for swiveling movement of said main carrier in relation to the base, whereby the vehicle seat can be converted from a forward position with said main carrier having a forward facing orientation relative to said base into a backward position with said main carrier having a backward facing orientation relative to said base;

a first cushioned carrier with upholstery;

a connection between said first cushioned carrier and said main carrier for displaceable movement of said first cushioned carrier between a moved-in position and an extended position in relation to said main carrier, said first cushioned carrier in the moved-in position providing an upholstery seat in the forward position and said first cushioned carrier in the extended position providing an upholstery backrest in the backward position;

a second cushioned carrier with upholstery;

a connection between said second cushioned carrier and said main carrier for displaceable movement of said second cushioned carrier between a moved-in position and an extended position in relation to said main carrier, said second cushioned carrier in the extended position providing an upholstery backrest in the forward position and said second cushioned carrier in the moved-in position providing an upholstery seat in the backward position;

a first support displaceable in relation to said first cushioned carrier, said first support forming a backward support headrest in the backward position, said backward support headrest having a user head portion contact surface for contacting a head portion of a user in the backward position; and a second support displaceable in relation to said second cushioned carrier, said second support forming a forward support headrest in the forward position, said forward support headrest having a user head engaging surface for engaging the head portion of a user in the forward position.

19. A motor vehicle seat in accordance with claim 18, wherein:

said first support is displaceable in relation to said first cushioned carrier by means of at least one pair of extension bars, said first support having a first support end, said first support end being located at a first distance from said first cushioned carrier in the forward position, said first support end being located at a second distance from said first cushioned carrier in the backward position, said first distance being less than said second distance; and said second support is displaceable in relation to said second cushioned carrier by means of at least one pair of extension bars, said second support forming a headrest in the forward position, said second support having a second support end, said second support end being located at a first support distance from said second cushioned carrier in the forward position, said second support end being located at a second support distance from said second cushioned carrier in the backward position, said first support distance being greater than said second support distance.

20. A motor vehicle seat in accordance with claim 18, wherein said first cushioned carrier has a first cushioned carrier end, said first cushioned carrier end being located at a first distance from said main carrier in the forward position, said first cushioned carrier end being located at a second distance from said main carrier in said the backward position, said first distance being less than said second distance, said second cushioned carrier having a second cushioned carrier end, said second cushioned carrier end being located at a first carrier distance from said main carrier in the forward position, said second cushioned carrier end being located at a second carrier distance from said main carrier in the backward position, said first carrier distance being greater than said second carrier distance, said first support forming a forward user leg contacting portion in the forward position for contacting a leg portion of the user, said forward user leg contacting portion being adjacent to said upholstery of said first cushioned carrier in the forward position, said second support forming a backward user leg engaging portion in the backward position for engaging the leg portion of the user, said backward user leg engaging portion being adjacent to said upholstery of said second cushioned carrier in the backward position.

* * * * *